(12) United States Patent  (10) Patent No.: US 9,111,583 B2
Trantham  (45) Date of Patent: Aug. 18, 2015

(54) DATA STORAGE DEVICE INCLUDING SELF-TEST FEATURES

(75) Inventor: Jon D. Trantham, Chanhassen, MN (US)

(73) Assignee: Seagate Technology LLC, Cupertino, CA (US)

( * ) Notice: Subject to any disclaimer, the term of this patent is extended or adjusted under 35 U.S.C. 154(b) by 490 days.

(21) Appl. No.: 13/424,853

(22) Filed: Mar. 20, 2012

(65) Prior Publication Data

US 2012/0170435 A1  Jul. 5, 2012

Related U.S. Application Data

(62) Division of application No. 12/206,968, filed on Sep. 9, 2008, now abandoned.

(51) Int. Cl.
*G11B 27/36* (2006.01)

(52) U.S. Cl.
CPC ........ *G11B 27/36* (2013.01); *G11B 2220/2516* (2013.01)

(58) Field of Classification Search
CPC .......... G11B 27/36; G11B 7/00; G06F 12/00; G06F 11/08; G06F 11/00; G06F 12/16; G06F 1/30; G06F 17/30; G06F 1/28; G06F 12/14; H03M 13/03; G11C 5/00; G11C 5/14
USPC ................... 369/53.1, 53.42; 702/60
See application file for complete search history.

(56) References Cited

U.S. PATENT DOCUMENTS

| | | |
|---|---|---|
| 4,637,022 A | 1/1987 | Burke et al. |
| 6,016,553 A | 1/2000 | Schneider et al. |
| 6,122,131 A | 9/2000 | Jeppson |
| 6,199,178 B1 | 3/2001 | Schneider et al. |
| 6,240,527 B1 | 5/2001 | Schneider et al. |
| 6,255,801 B1 * | 7/2001 | Chalasani ...................... 320/132 |
| 6,289,484 B1 | 9/2001 | Rothberg et al. |
| 6,295,577 B1 | 9/2001 | Anderson et al. |
| 6,467,054 B1 * | 10/2002 | Lenny ............................. 714/42 |
| 6,574,754 B1 | 6/2003 | Smith |
| 6,745,286 B2 | 6/2004 | Staub et al. |
| 6,775,792 B2 | 8/2004 | Ulrich et al. |
| 6,856,556 B1 * | 2/2005 | Hajeck ..................... 365/189.11 |
| 6,862,692 B2 | 3/2005 | Ulrich et al. |
| 6,871,295 B2 | 3/2005 | Ulrich et al. |
| 6,957,291 B2 | 10/2005 | Moon et al. |
| 6,990,547 B2 | 1/2006 | Ulrich et al. |
| 7,028,220 B2 | 4/2006 | Park |
| 7,356,730 B2 | 4/2008 | Ulrich et al. |
| 7,613,975 B2 | 11/2009 | Jibry et al. |
| 2002/0124137 A1 | 9/2002 | Ulrich et al. |
| 2002/0156975 A1 | 10/2002 | Staub et al. |

(Continued)

*Primary Examiner* — Mohamed Charioui
*Assistant Examiner* — Ruihua Zhang
(74) *Attorney, Agent, or Firm* — Westman, Champlin & Koehler, P.A.

(57) ABSTRACT

The application discloses a data storage device including one or more data storage media adapted to store data. The data storage device is connected to and powered by a power source of the host system. In the event of a loss of power from the host system, an auxiliary power source is used to power components of the data storage device. For example, an illustrative auxiliary power source uses back electromotive force EMF from a spindle motor of the data storage device. As disclosed, the device includes test circuitry to test a capacity of the auxiliary power source to store data in the event of the loss of power from the host system.

18 Claims, 7 Drawing Sheets

(56) References Cited

U.S. PATENT DOCUMENTS

| | | |
|---|---|---|
| 2002/0165942 A1 | 11/2002 | Ulrich et al. |
| 2002/0166079 A1 | 11/2002 | Ulrich et al. |
| 2002/0194523 A1 | 12/2002 | Ulrich et al. |
| 2002/0194526 A1 | 12/2002 | Ulrich et al. |
| 2003/0061546 A1* | 3/2003 | Collins et al. .................. 714/42 |
| 2004/0148543 A1 | 7/2004 | Eto et al. |
| 2004/0153607 A1* | 8/2004 | Rowlands et al. ............ 711/118 |
| 2004/0210796 A1 | 10/2004 | Largman et al. |
| 2005/0144514 A1 | 6/2005 | Ulrich et al. |
| 2006/0010344 A1 | 1/2006 | Zorek, Sr. et al. |
| 2006/0067192 A1 | 3/2006 | Tani |
| 2006/0075202 A1* | 4/2006 | Gaertner et al. ............. 711/162 |
| 2008/0005474 A1* | 1/2008 | Long ............................. 711/118 |
| 2008/0151717 A1 | 6/2008 | Yatsugi et al. |
| 2008/0267045 A1 | 10/2008 | Nakajima et al. |

\* cited by examiner

DATA STORAGE DEVICE INCLUDING SELF-TEST FEATURES

CROSS-REFERENCE TO RELATED APPLICATION

The present application is a divisional application of and claims priority to copending U.S. patent application Ser. No. 12/206,968 filed Sep. 9, 2008, the content of which is hereby incorporated by reference in its entirety.

BACKGROUND

Data storage devices are coupled to a host system and receive power from the host system for operation. Typically such data storage devices include non-volatile storage media, such as magnetic discs within a hard disc drive and flash memory chips within a solid-state drive. Some storage systems, such as a hybrid disc drive, contain a mixture of non-volatile media types. In general, hybrid disc drives include non-volatile electronics, such as flash memory, that can be used in conjunction with the non-volatile rotating storage media to retain data in an event of power loss and reset events.

In storage devices, kinetic momentum of the rotating storage media can be used as an auxiliary power source to store data or power components in the event of a power loss from the host system. Additionally, auxiliary power devices, such as a battery or a double-layer capacitor, can provide an auxiliary power source. Failure of the auxiliary power source to power components in the event of power loss from the host system can cause unexpected loss and/or corruption of data, which can be catastrophic to a user.

SUMMARY

The application discloses test circuitry configured to test capacity of the auxiliary power source to store data to storage media of the data storage device upon loss of power from a host system. In illustrated embodiments, the capacity of the auxiliary power source is tested at the time of manufacture and a failure prediction component uses the tested capacity to determine failure of the device. In an illustrated embodiment, the test circuitry includes instructions to store bits of data utilizing the auxiliary power source until the auxiliary power source is exhausted. A quantity of the data bits stored utilizing the auxiliary power source is used to determine the capacity of the auxiliary power source and/or predict failure of the data storage device. Other features and benefits that characterize embodiments of the present invention will be apparent upon reading the following detailed description and review of the associated drawings.

DETAILED DESCRIPTION OF ILLUSTRATIVE EMBODIMENTS

Figure 1:
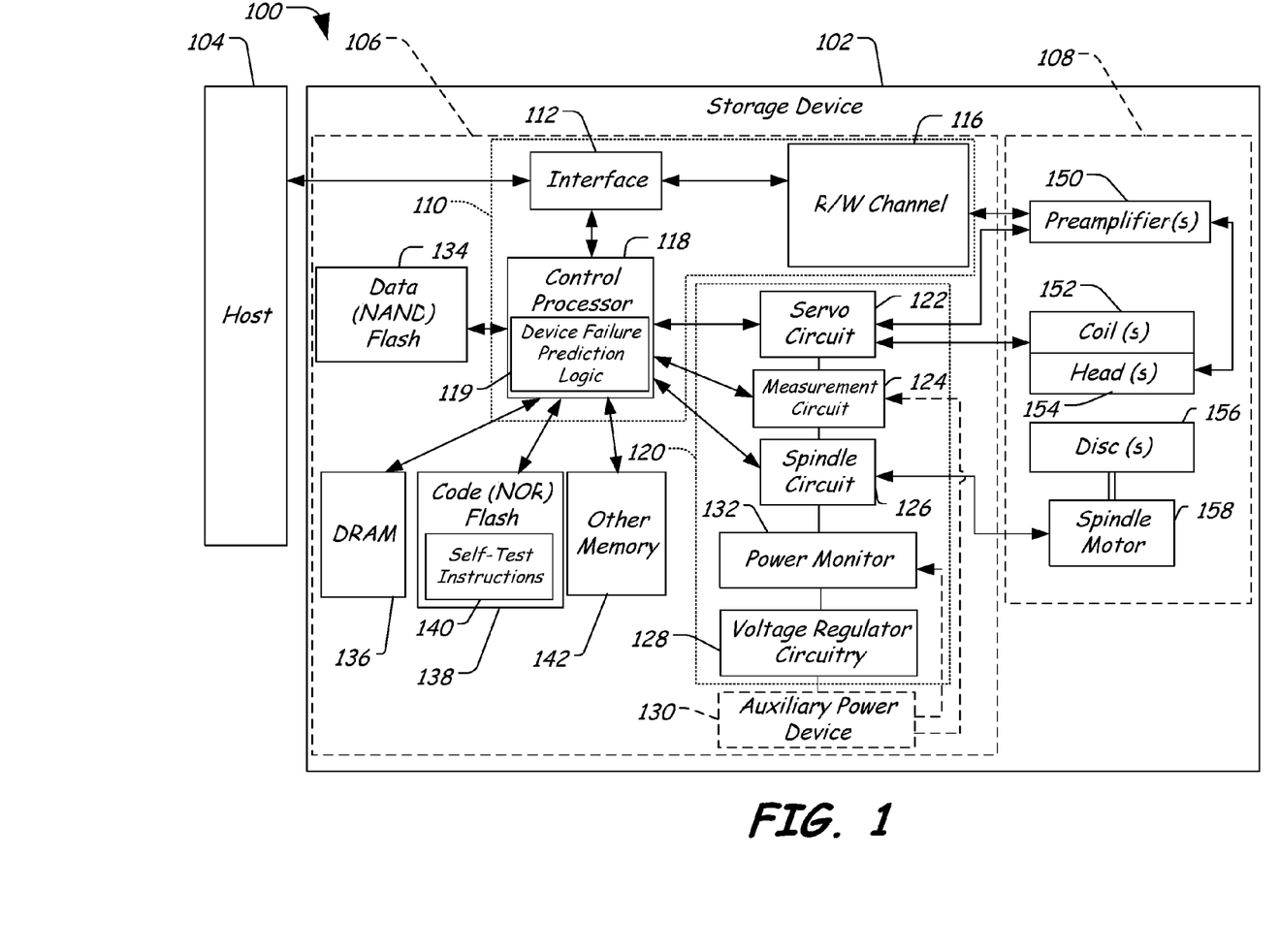
FIG. 1 is a block diagram of a particular illustrative embodiment of a system including a hybrid storage device that has a measurement circuit and a spindle power monitor to test the storage device.

FIG. 1 is a block diagram of a particular illustrative embodiment of a system 100 including a hybrid storage device 102 that has a measurement circuit 124 and a power monitor 132 used to test the storage device 102. As used herein, the term "hybrid storage device" refers to a data storage device that includes both rotating storage media and solid-state storage media. The storage device 102 is adapted to communicate with a host system 104. In a particular embodiment, the host system 104 is typically a computer, but could be a bus expander, a processor, a personal digital assistant (PDA), another electronic device, or more generally any device capable of generating and/or relaying commands to a mass storage device.

The storage device 102 includes recording subsystem circuitry 106, a head-disc assembly 108, and disc-head assembly control circuitry 120, which includes monitoring circuitry. The recording subsystem circuitry 106 includes an interface circuit 112, which includes a data buffer for temporarily buffering the data and a sequencer for directing the operation of the read/write channel 116 and the preamplifier 150 during data transfer operations. The interface circuit 112 is coupled to the host system 104 and to a control processor 118, which is adapted to control operation of the storage device 102. In a particular embodiment, the control processor 118 includes device failure prediction logic 119 that is adapted to predict a failure associated with the storage device 102 based on one or more measured performance parameters. In an alternative embodiment, the device failure prediction logic 119 can be separate from the control processor 118. In a particular example, the device failure prediction logic 119 can be included within the measurement circuit 124. The control processor 118 is coupled to a servo circuit 122 that is adapted to control the position of one or more read/write heads 154 relative to one or more discs 156 as part of a servo loop established by the one or more read/write heads 154. Generally, the one or more read/write heads 154 are mounted to a rotary actuator assembly to which a coil 152 of a voice coil motor (VCM) is attached. As is known in the art, a VCM includes a pair of magnetic flux paths between which the coil 152 is disposed so that the passage of current through the coil 152 causes magnetic interaction between the coil 152 and the magnetic flux paths, resulting in the controlled rotation of the actuator assembly and the movement of the one or more heads 154 relative to the surfaces of the one or more discs 156. The servo circuit 122 is used to control the application of current to the coil 152, and hence the position of the heads 154 with respect to the tracks of the one or more discs 156.

In general, the disc-head assembly control circuitry 120 includes the servo circuit 122 and includes a spindle circuit 126 that is coupled to a spindle motor 158 to control the rotation of the one or more discs 156. The disc-head assembly control circuitry 120 further includes a measurement circuit 124 that is coupled to the control processor 118 and that is adapted to measure one or more electrical parameters associated with the storage device 102.

In a particular embodiment, the disc-head assembly control circuitry 120 includes a power monitor 132 that is coupled to the spindle circuit 126 and adapted to measure the usable energy available in the back electromotive force associated with the spindle motor 158. In a particular example, the back electromotive force (EMF) represents the spindle motor 158 operating as a generator, utilizing a kinetic inertia associated with the rotation of the one or more discs 156 to generate the back EMF. In a particular instance, the energy from the back EMF may be measured as a power level. When power is interrupted to the storage device, the control processor 118 programs the data into the non-volatile memory component, such as the data flash 134. In a particular example, once the user's data and the firmware metadata have been stored, the measurement circuitry 124 can record the time it took to program the data flash 134. The control processor 118 can then program one bit of memory (of the data flash 134) at fixed periodic intervals until the power from the spindle motor 158 has been exhausted. When power is restored, the device failure prediction logic 119 can use the stored bits to determine how much power the spindle motor 158 supplied.

The storage device 102 also includes an auxiliary power device 130 that is coupled to the spindle power monitor 132 and to the measurement circuit 124. In a particular embodiment, the auxiliary power device 130 can be a capacitor or a battery that is adapted to supply power to the storage device 102 under certain operating conditions. In a particular example, the auxiliary power device 130 can provide a power supply to the recording subsystem assembly 106 and to the disc-head assembly 108 to record data to the one or more discs 156 when power is turned off. Further, the auxiliary power device 130 may supply power to the recording subsystem assembly 106 to record data to a data flash 134 or to a code (NOR) flash 138 when power is turned off.

Additionally, the storage device 102 includes a non-volatile solid-state storage component for data, labeled "data (NAND) flash" 134. Although NAND flash is shown in FIG. 1, the flash memory 134 could be any non-volatile electronic storage component capable of storing data. For example, the flash memory 134 could be NAND flash, NOR flash, MRAM, phase-change memory, another solid-state memory, or any combination thereof. Additionally, the storage device 102 typically includes a dynamic random access memory (DRAM) 136, and or other memory, or any combination thereof.

Additionally, the storage device 102 includes internal code storage 138. Although the internal code storage block shown generally indicated at 138 is labeled for purposes of easy comprehension as "code (NOR) flash", the "code (NOR) flash 138 could be any non-volatile solid-state storage component, and in some embodiments the code storage might only exist as a portion of the data storage component 134. In a particular embodiment, the code (NOR) flash 138 stores self-test instructions 140, including instructions to monitor particular performance parameters associated with the storage device 102 each time data is written to, read from, and/or erased from the storage device 102. In a particular example, the self-test instructions 140 include a sequence of data values that can be written to an erased block within the data (NAND) flash 134, for example, while the write time is measured by the measurement circuit 124.

In general, the storage device 102 frequently erases, writes and reads non-volatile electronics (NVE), such as the data (NAND) flash 134 and the code (NOR) flash 138, to retain data through power loss and reset events. In flash components, erasing and writing of the NVE is typically accomplished by storing and depleting electrical charges in a "floating" gate in a NOR or NAND gate cell, many of which are included in a single NVE memory. In a phase-change memory, erasing and writing are accomplished by heating and cooling chalcogenic material to switch it between amorphous and crystalline states. Unfortunately, it is common for these and other NVE storage devices to degrade with usage in their ability to store data, which degradation results in changes of erase and/or write and/or read times up and to the point of failure.

During operation of the storage device 102, the measurement circuit 124 measures and records a length of time to complete an erase/write/read operation for a portion of the memory, such as a block, page, segment, paragraph, etc. or for the entire memory. Not shown here, it is a common practice to perform signal conditioning, such as to normalize and/or filter the measured times. The device failure prediction logic 119 is adapted to compare the measured erase/write/read time to a corresponding threshold, and if the threshold is exceeded, the device failure prediction logic 119 is adapted to initiate one or more recovery steps via the control processor 118. The one or more recovery steps can include, but are not limited to, retrying the operation, performing additional testing on the storage, reconditioning the storage, reallocating the affected block/page, asserting an error message to the host system 104, posting an error, and performing further testing on the flash segment. In a particular embodiment, the device failure prediction logic 119 may be adapted to monitor programming time on a historical basis and to use trends, filtered or unfiltered, to make intelligent device failure predictions.

In a particular embodiment, the data storage device 102 includes a non-volatile storage media, such as the one or more discs 156, the data (NAND) flash 134, the code (NOR) flash 138, other memory 140, or any combination thereof. The non-volatile storage media is adapted to store data, including instructions executable by the control processor, user data, measurement data, other information, or any combination thereof.

The storage device 102 includes the measurement circuit 124 that is adapted to measure at least one performance parameter related to the non-volatile storage media during operation. In a particular example, the at least one performance parameter is an erase time, a write time, a read time, or any combination thereof, that is associated with the data (NAND) flash 134, the code (NOR) flash 138, the other memory 142, or any combination thereof. In another particular example, the at least one performance parameter is the usable energy available from the back electromotive force associated with the spindle motor 158. The back electromotive force represents electrical energy generated by the spindle motor 158 using a kinetic inertia associated with rotation of the one or more discs 156. In still another particular example, the at least one performance parameter is a power level associated with the auxiliary power device 130 when the auxiliary power device 130 supplies power to the recording subsystem assembly 106.

The storage device 102 further includes logic, such as the device failure prediction logic 119, that is coupled to the measurement circuit 124 and that is adapted to predict a failure associated with at least a portion of the non-volatile storage media, when the measured performance parameter exceeds a threshold value. For example, the erase/write/read time associated with the data (NAND) flash 134 changes as the data (NAND) flash 134 deteriorates. When the (normalized and/or filtered) measured erase/write/read time associated with the data (NAND) flash 134 exceeds a corresponding threshold, the logic is adapted to predict a failure associated with the data (NAND) flash 134 and to take corrective action to prevent data loss.

In another example, when the measured power level of the auxiliary power device 130 falls below a power threshold, the logic is adapted to predict a failure associated with the auxiliary power device 130, which may indicate that the storage device 102 may be unable to record data to the non-volatile storage media when power is lost. In this example, the logic is adapted to take a corrective action to prevent data loss in response to the predicted failure. In still another example, when the measured back EMF from the spindle motor 158 falls below an EMF threshold, the logic is adapted to predict a failure and to take action to prevent data loss.

In a particular example, the storage device 102 is adapted to reallocate data from a first storage location to a second storage location in response to the predicted failure. In another particular example, the storage device 102 is adapted to prohibit access to at least a portion of the non-volatile storage media in response to the predicted failure. In another particular example, the storage device 102 disables volatile write-caching as a response to a predicted failure. In still another particular example, the storage device 102 is adapted to generate an alert, such as an error message, and to communicate the alert to the host system 104 via the interface 112.

Further, using the built-in self-test, it is possible to test the non-volatile electronics, such as the flash memory, without external test equipment. Additionally, the built-in self-test, such as the self-test instructions 140, and the measurement circuitry 124 make it possible to periodically test the storage device 102 during regular operation to ensure that the non-volatile memory, such as the data (NAND) flash 134 and the code (NOR) flash 138, continues to work reliably. In a particular embodiment, the built-in self-test instructions 140 include a set of data patterns for erasing and reprogramming the flash memories 134 and 138. For example, the test patterns can include a pattern of all one ("1") values, a pattern of all zero ("0") values, a "walking ones" pattern, a "walking zeroes" pattern, a pattern containing the logical or physical storage address, a pseudorandom pattern, another pattern, or any combination thereof. In a particular embodiment, the control processor 118 is adapted to use the self-test instructions 140 to erase and reprogram the data (NAND) flash 134. During erase, write, and read operations, the measurement circuitry 124 measures the erase/write/read time.

In a particular embodiment, the device contains voltage regulator circuitry 128 that can be controlled to provide a higher or lower voltage than normal, "margining" the voltage supply to provide additional stress factors that can ferret out weak or defective components. In a particular example, the control processor 118 uses the built-in self-test instructions 140 to run a series of erase/programming cycles against the memory using the patterns. The tests can be repeated with the voltage margined high or low. The results of the tests can be used to identify failing components and to make decision about the overall health of the storage device 102. In a particular implementation, the storage device 102 can include a programmable clock that allows the data (NAND) flash 134, the code (NOR) flash 138, other memory, or any combination thereof to be run at faster or slower than normal clock speeds, providing additional stress on the non-volatile electronics. Further, testing may be performed using various combinations of the above stresses.

Figure 2:
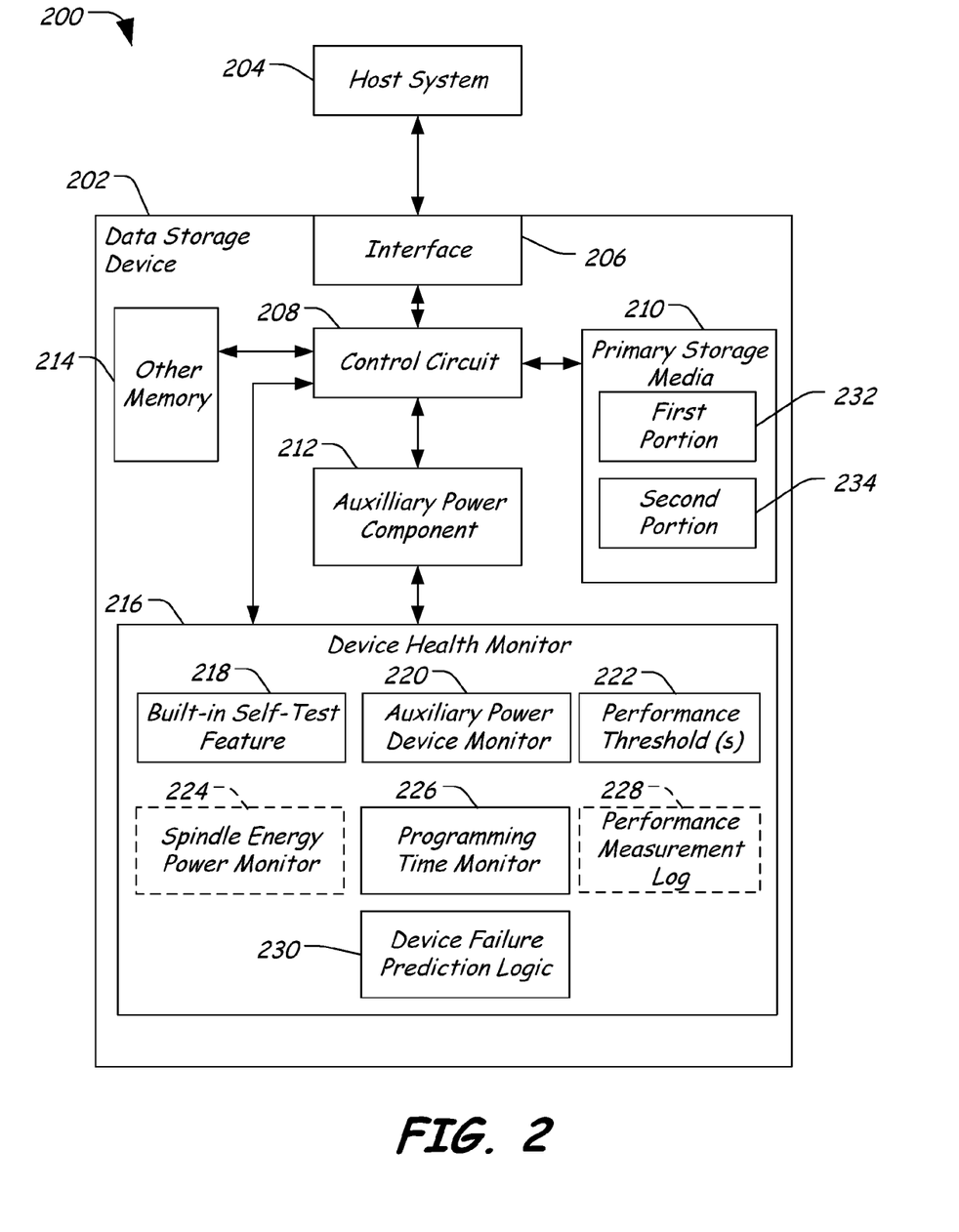
FIG. 2 is a block diagram of a second particular illustrative embodiment of a system including a storage device that has a device health monitor to test the storage device.

FIG. 2 is a block diagram of a second particular illustrative embodiment of a system 200 including a data storage device 202 that has a device health monitor 216 to test the data storage device 202. In a particular embodiment, the data storage device 202 is a solid-state memory device that is adapted to communicate with a host system 204 via an interface 206. The data storage device 202 includes a control circuit 208 that is adapted to communicate with a primary storage media 210 and with other memory 214. The control circuit 208 is also coupled to an auxiliary power component 212. In a particular embodiment, the auxiliary power component 212 is an energy storage component, such as a battery or a capacitor, which is adapted to provide auxiliary power to the storage device 202 when power is lost. The control circuit 208 is also coupled to the device health monitor 216, which monitors one or more performance parameters associated with the storage device 202 to predict a storage device failure.

The device health monitor 216 includes a built-in self-test feature 218, which may be used by the controller 208 to test a health associated with the primary storage media 210 or the other memory 214. In a particular example, the built-in self-test feature 218 includes instructions executable by the control circuit 208 to erase a block of data from a selected memory, such as the primary storage media 210, to write a new page of data to the selected memory, and to read a page of data from the selected memory. The built-in self-test feature 218 may also include a data sequence to be written to the selected memory. The device health monitor 216 also includes an auxiliary power device monitor 220 adapted to monitor a power supplied by the auxiliary power component 212 when the auxiliary power component 212 is acting as an energy source. The device health monitor 216 further includes one or more performance thresholds 222. In a particular illustrative embodiment, the device health monitor 216 may include a spindle energy power monitor 224, when the primary storage media 210 is a rotating storage media that is rotated using a spindle motor, such as the spindle motor 158 illustrated in FIG. 1. In an alternative embodiment, where the storage device 202 is a solid-state storage device, the spindle energy power monitor 224 may be omitted.

The device health monitor 216 further includes a programming time monitor 226 that is adapted to monitor an erase time, a write time, a read time, or any combination thereof, when data are erased, written, or read to/from a selected memory, such as the primary storage media 210 or the other memory 214. In a particular embodiment, the device health monitor 216 includes a performance measurement log 228 that is adapted to record measurement data related to the one or more measured performance parameters. Finally, the device health monitor 216 includes device failure prediction logic 230 that is adapted to predict a failure associated with the storage device 202 based on at least one of the one or more measured performance parameters.

In a particular embodiment, the storage device 202 includes a control circuit 208 that is coupled to a non-volatile storage media, such as the primary storage media 210, the other memory 214, or any combination thereof. The control circuit 208 is adapted to control read/write access to the non-volatile storage media. In a particular example, the device health monitor 216 is adapted to monitor one or more performance parameters associated with the storage device 202 to predict a failure associated with the storage device 202, when at least one of the one or more performance parameters exceeds a respective performance threshold of the one or more performance thresholds 222.

In a particular embodiment, the control circuit 208 is adapted to take corrective action to prevent data loss in response to the predicted failure. In a particular example, the control circuit 208 is adapted to reallocate data from a first portion 232 of the primary storage media 210 to a second portion 234 of the primary storage media 210 in response to the predicted failure. In another particular example, the control circuit 208 is adapted to prohibit access to the first or second portions 232 or 234 of the primary storage media 210 in response to the predicted failure. In another particular example, the control circuit 208 disables volatile write-caching as a response to a predicted failure. In another particular example, the control circuit 208 is adapted to generate an alert and to send the alert to the host system 204 via the interface 206 in response to the predicted failure.

In a particular embodiment, the primary storage media 210 is a non-volatile, solid-state memory. The device health monitor 216 is adapted to utilize the built-in self-test feature 218 and the programming time monitor 226 each time the primary storage media 210 is accessed to determine a time parameter, which is compared to one of the performance thresholds 222 to predict a failure associated with at least a portion of the primary storage media 210.

Figure 3:
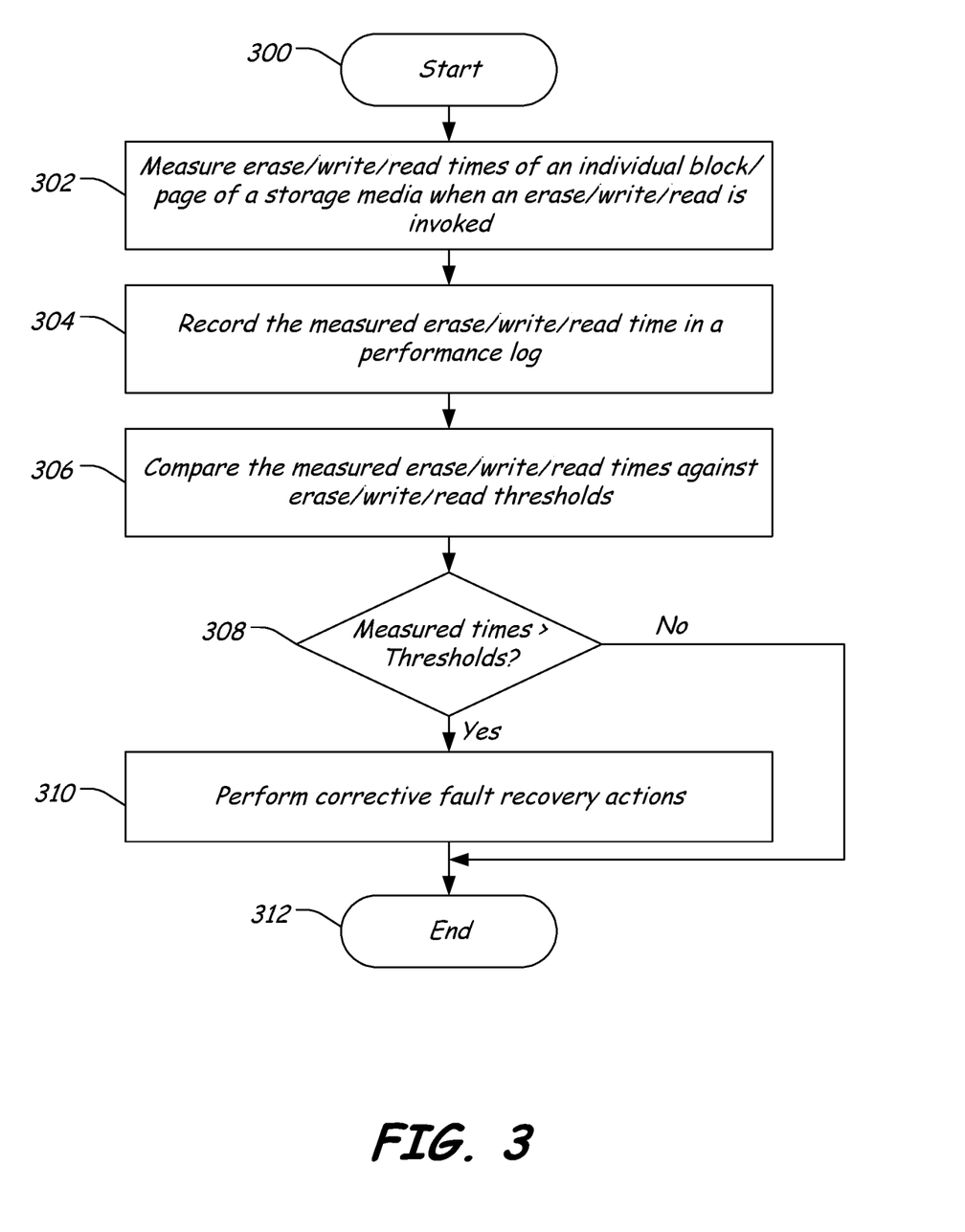
FIG. 3 is a flow diagram of a particular illustrative embodiment of a method of performing a self-test of a storage device.

FIG. 3 is a flow diagram of a particular illustrative embodiment of a method of performing a self-test of a storage device. The method starts at 300. At 302, erase/write/read times of an individual block/page of a storage media are measured when an erase/write/read process is invoked. In a particular embodiment, the erase/write/read process can be invoked by a host system, by an interrupt, by a controller of the storage device, by another process, or any combination thereof. Moving to 304, the measured erase/write/read times are recorded in a performance log. Continuing to 306, the measured erase/write/read times are compared against erase/write/read thresholds. Advancing to 308, when the measured erase, write, or read times do not exceed corresponding erase/write/read thresholds, the method terminates without error at 312.

Returning to 308, when the measured erase/write/read times exceed corresponding erase/write/read thresholds, the method proceeds to 310 and corrective fault recovery actions are performed. In a particular example, a corrective fault recovery action may include disabling volatile write-caching as a response to a predicted failure. In another particular example, the corrective fault recovery action may include generating an alert to a host system, reallocating data from a first portion to a second portion a storage media, prohibiting access to the a portion of the storage media, taking other data protection actions, or any combination thereof. The method terminates at 312.

Figure 4:
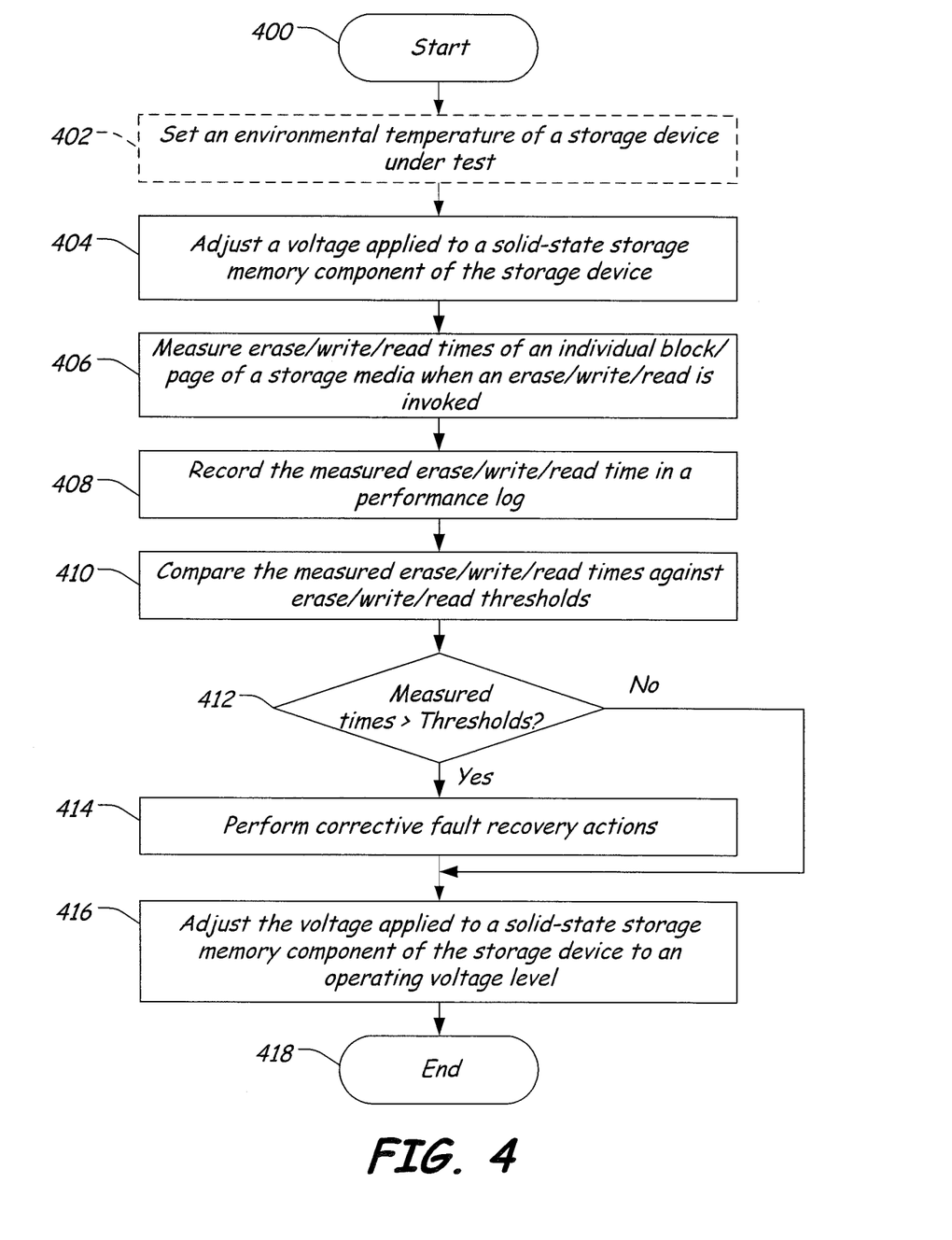
FIG. 4 is a flow diagram of a second particular illustrative embodiment of a method of performing a self-test of a storage device.

FIG. 4 is a flow diagram of a second particular illustrative embodiment of a method of performing a self-test of a storage device. The method starts at 400. At 402, optionally, an environmental temperature of a storage device under test is set. Advancing to 404, a voltage is adjusted that is applied to a solid-state storage memory component of the storage device. Continuing to 406, erase/write/read times of an individual block/page of a storage media are measured when an erase/write/read process is invoked. In a particular embodiment, the erase/write/read process can be invoked by a host system, by an interrupt, by a controller of the storage device, by another process, or any combination thereof. Moving to 408, the measured erase/write/read times are recorded in a performance log. Continuing to 410, the measured erase/write/read times are compared against erase/write thresholds. Advancing to 412, when the measured erase and write times do not exceed corresponding erase/write thresholds, the method advances to 416 and the voltage that is applied to a solid-state storage memory component of the storage device is adjusted to an operating voltage level. The method terminates at 418.

Returning to 412, when the measured erase/write/read times exceed corresponding erase/write/read thresholds, the method proceeds to 414 and corrective fault recovery actions are performed. In a particular example, a corrective fault recovery action may include disabling volatile write-caching as a response to a predicted failure. In another particular example, the corrective fault recovery action may include generating an alert to a host system, reallocating data from a first portion to a second portion a storage media, prohibiting access to the a portion of the storage media, taking other data protection actions, or any combination thereof. Continuing to 416, the voltage that is applied to a solid-state storage memory component of the storage device is adjusted to an operating voltage level. The method terminates at 418.

In general, non-volatile memory devices, such as the data (NAND) flash 134 and the code (NOR) flash 138 illustrated in FIG. 1, are tested by a manufacturer prior to shipment. These tests are performed by iteratively erasing and then writing and reading the non-volatile memory devices using a plurality of test patterns. If the memory device passes its tests, the memory device is shipped to the end user for incorporation into a final product. However, it is sometimes beneficial to test the non-volatile memory device after it is installed into the final product. For storage devices, such as the hybrid storage device 102 illustrated in FIG. 1, it is sometimes desirable to test the non-volatile memory devices after assembly is complete. Further, using the built-in self-test, it is possible to test the non-volatile electronics, such as the flash memory, without external test equipment or with less-costly test equipment. Additionally, the built-in self-test and the measurement circuitry make it possible to periodically test the storage device during regular operation to ensure the non-volatile memory continues to work reliably.

In a particular embodiment, a manufacturer's test equipment can invoke the built-in self-tests at various temperatures as an additional stress that is not always present in the field. Further, a manufacturer's test process can use the built-in self-test, optionally in conjunction with the measurement circuitry (such as a programming time monitor), to collect data about the device performance. The data can be used as part of a statistical process control to monitor and control the quality of the final product.

Figure 5:
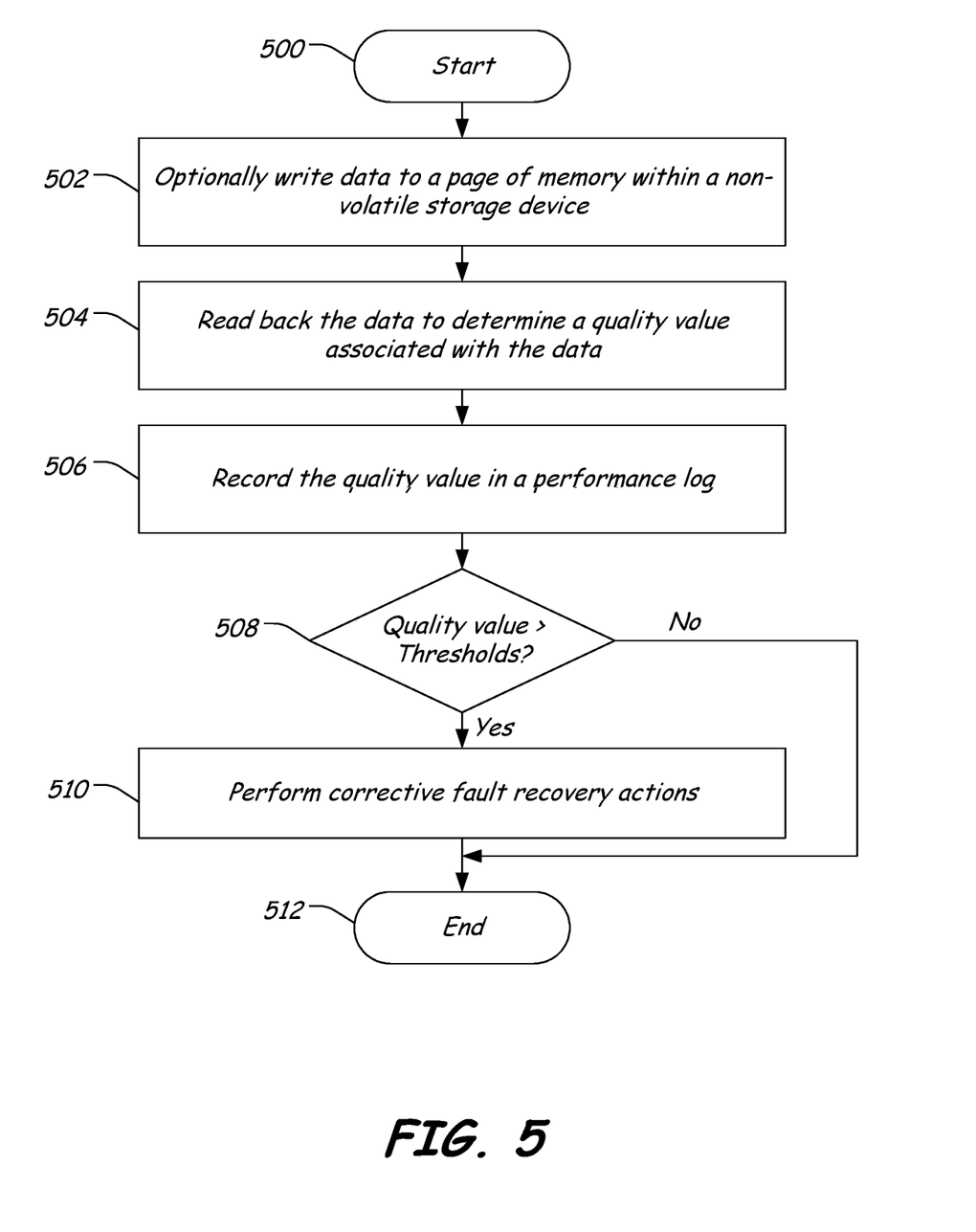
FIG. 5 is a flow diagram of a third particular illustrative embodiment of a method of performing a self-test of a storage device.

FIG. 5 is a flow diagram of a third particular illustrative embodiment of a method of performing a self-test of a storage device. The method starts at 500. At 502, data are optionally written to a page of memory within the non-volatile storage. In general, block 502 is unnecessary if the data are known or can be determined via an error-correcting code. Advancing to 504, the data are read back to determine a quality value associated with the data. In a particular embodiment, the quality value is related to the number of bits in error within the page. In another particular embodiment, the quality value is determined by totaling the mean-square error of the sensed storage level of each individual bit cell from its optimal value. For example, if the non-volatile electronic storage device contains circuitry capable of converting the analog voltage of a bit cell's charge to a digital value, this information can be used to determine a value related to the amount of error. Proceeding to 506, the quality value is recorded in a performance log. Moving to 508, the quality value is compared to a threshold. If the quality value is less than the threshold, the method terminates without error at 512. Returning to 508, if the quality value is greater than the threshold, the method advances to 510 and corrective action is performed to protect the data. The method terminates at 512.

Figure 6:
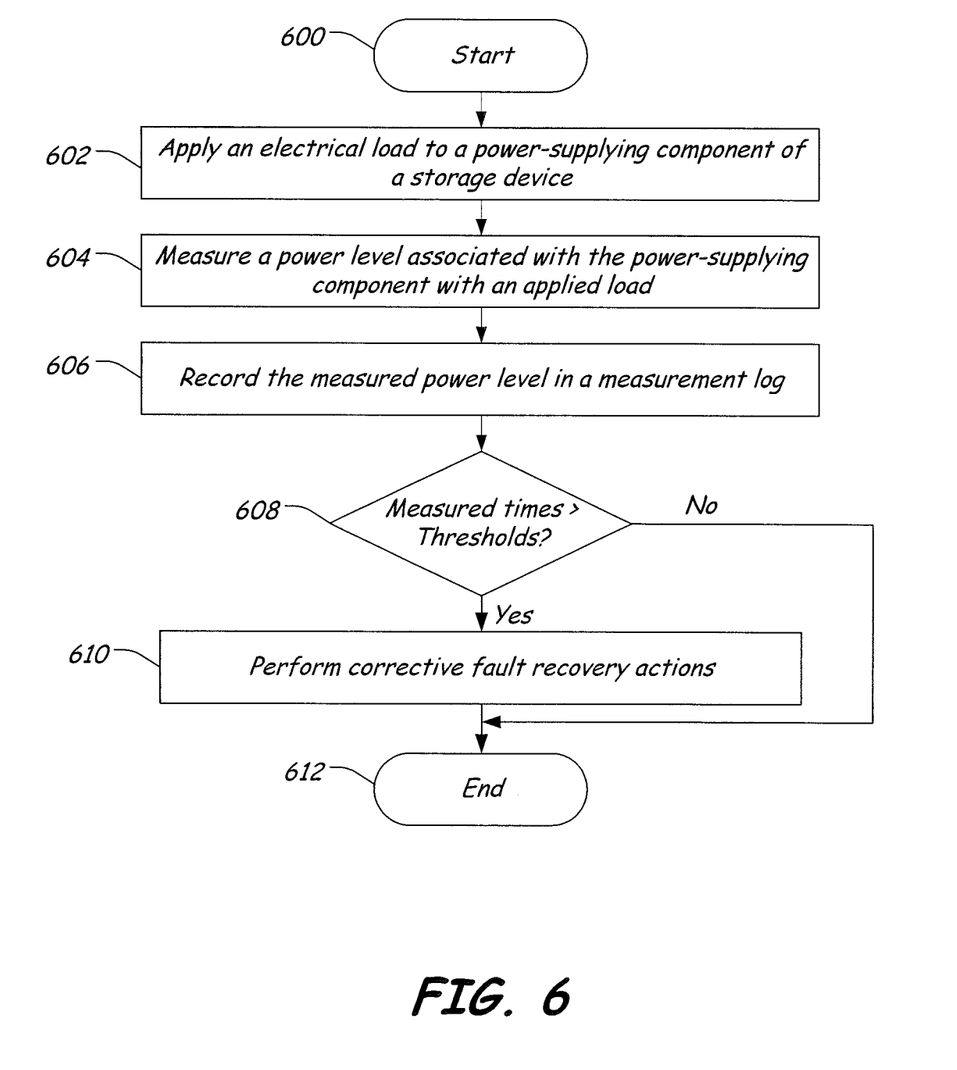
FIG. 6 is a flow diagram of a fourth particular illustrative embodiment of a method of performing a self-test of a storage device.

FIG. 6 is a flow diagram of a fourth particular illustrative embodiment of a method of performing a self-test of a storage device. The method starts at 600. At 602, an electrical load is applied to a power-supplying component of a storage device. Advancing to 604, a power level associated with read/write circuitry of a storage device including a storage media is measured when data is erased from or written to a portion of the storage media. In a particular example, the power level is measured from a spindle motor, an auxiliary power device, another component, or any combination thereof, using a measurement circuit. In a particular illustrative embodiment, the power level is determined by measuring the length of time in which the spindle motor or power device remains above a threshold. This is accomplished by periodically programming a series of non-volatile locations at fixed timed intervals until power falls below a threshold.

Continuing to 606, the measured power level is recorded in a measurement log. Proceeding to 608, the measured power level is compared to a threshold value. In a particular example, the measured power level is compared to the threshold time value by logic, which may be part of the measurement circuit, a control circuit, a processor, or any combination thereof. At 608, if the measured power level is less than a threshold value, the method is terminated without error at 612. Otherwise, at 608, if the measured power level exceeds a threshold value, the method advances to 610 and corrective fault recovery actions are performed. The corrective fault recovery actions may include disabling volatile write-caching as a response to a predicted failure. In another particular example, the corrective fault recovery action may include generating an alert to a host system, reallocating data from a first portion to a second portion a storage media, prohibiting access to the a portion of the storage media, taking other data protection actions, or any combination thereof. In a particular embodiment, the power level may be adjusted to a normal operating power level prior to termination. The method terminates at 612.

Figure 7:
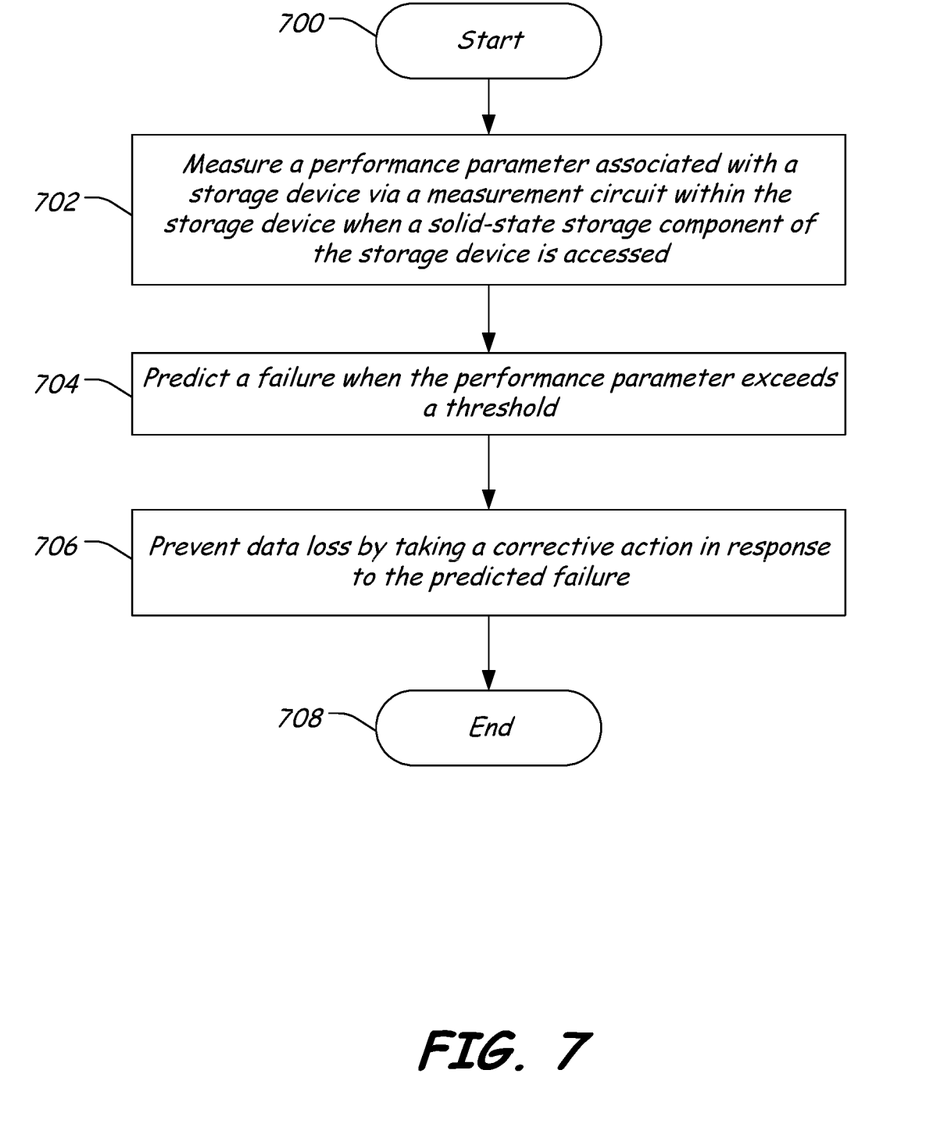
FIG. 7 is a flow diagram of a fifth particular illustrative embodiment of a method of performing a self-test of a storage device.

FIG. 7 is a flow diagram of a fifth particular illustrative embodiment of a method of performing a self-test of a storage device. The method starts at 700. At 702, a performance parameter associated with at least one storage media of a storage device is measured via a measurement circuit within the storage device when the at least one storage media is accessed. In a particular embodiment, the performance parameter comprises a read time, a write time, an erase time, or any combination thereof. In a particular illustrative embodiment, measuring the performance parameter includes measuring the energy associated with the back electromotive force (EMF) of a spindle motor of the storage device when at least one storage media is rotating, where the back EMF is power generated from the kinetic inertia of the storage media. In another particular illustrative embodiment, measuring the performance parameter includes measuring a power supply level associated with an auxiliary power supply when the auxiliary power supply is providing operating power to circuitry of the storage device.

Continuing to 704, a failure is predicted when the performance parameter exceeds a threshold. Proceeding to 706, data loss is prevented by taking a corrective action in response to the predicted failure. In a particular embodiment, circuitry of the storage device predicts the failure and prevents data loss by taking the corrective action. In a particular example, data loss is prevented by reallocating data from a memory location associated with the at least one storage media to another storage location in response to the predicted failure. In another particular example, data loss is prevented by prohibiting future write access to the at least one storage media in response to the predicted failure. The method terminates at 708.

In a particular embodiment, the method further includes generating an alert to a host system. The alert may be generated by logic, by a control circuit, by the measurement circuit, or any combination thereof. In general, the alert indicates an error message or annunciation associated with the at least one storage media in response to the predicted failure.

In general, it should be understood that the "start" blocks indicated at 300, 400, 500, 600, and 700 in FIGS. 3-7 represent a trigger that initiates the particular method flow. In general, the trigger may be initiated by a host system, such as the host systems 104 and 204 in FIGS. 1 and 2, may be initiated by firmware within a storage device, may be triggered by a peripheral device.

In general, the measurement circuitry is incorporated within the storage device to monitor performance parameters associated with the storage device during normal operation. By monitoring performance parameters, component failures may be predicted before data is lost by comparing the performance parameters to respective performance thresholds and by taking corrective action when the performance parameters deviate from the performance thresholds. In a particular example, when the power level falls below a power threshold, it may be desirable to perform further testing of the storage device to isolate a problem and to provide an error message to a host system that can be used to fix the problem. In general, one or more performance parameters can be measured, including the erase/write/reads times of the memory, the power supply of the auxiliary power device, the energy associated with the back electromotive force of the spindle motor, other performance parameters, or any combination thereof.

In a particular embodiment, once a failure is predicted, the control circuitry of the storage device can take precautions to protect user data, such as by reallocating the user data to another portion of the storage media that is tested to have better erase/reprogram times. Further, by including the measurement circuitry and the logic to determine corrective actions within the storage device, the storage device can be made to be more reliable, since device failures can be predicted before data is lost, allowing the device to take corrective action or allowing the device to notify the user so that the user can take corrective actions to protect the user data.

Although the present invention has been described with reference to preferred embodiments, workers skilled in the art will recognize that changes may be made in form and detail without departing from the spirit and scope of the invention.

What is claimed is:

1. A data storage assembly connectable to a host system comprising: one or more data storage media comprising one or more rotating discs powered by a spindle motor utilizing power from a host system in normal operation;
    an auxiliary power source comprising back electromotive force (EMF) derived from momentum of the rotating discs via the spindle motor configured to supply power to store data to the one or more data storage media in event of a loss of power from the host system; and
    test circuitry configured to test a usable energy available from momentum associated with the one or more spinning discs to supply the power to store the data in the event of the loss of power from the host system by interrupting power to the storage device, writing data to the one or more storage media until usable energy derived from momentum of the rotating discs via the spindle motor is exhausted, and determining how much usable energy is available based on the amount of data written after interrupting power to the storage device.

2. The data storage assembly of claim 1 and comprising:
    a failure prediction component configured to predict failure of the data storage assembly based upon the tested capacity of the auxiliary power source to supply the power to store the data in the event of the loss of power from the host system.

3. The data storage assembly of claim 1 wherein the test circuitry comprises instructions stored on the one or more data storage media implemented through a processor of the data storage assembly to test the capacity of the auxiliary power source.

4. The data storage assembly of claim 3 wherein the instructions are configured to store bits of data until the auxiliary power source is exhausted and the assembly comprises:
   a failure prediction component configured to use the bits of data stored to determine the capacity of the auxiliary power source.

5. The data storage assembly of claim 1 wherein the test circuitry further monitors a rotational speed of the one or more rotating discs to determine the capacity of the auxiliary power source to store the data in the event of the power loss.

6. The data storage assembly of claim 1 wherein the one or more data storage media includes an electronic solid state non-volatile memory.

7. The data storage assembly of claim 1 wherein the one or more data storage media include one or more NAND flash memories and the auxiliary power source further comprises one or more capacitors or batteries.

8. A data storage assembly comprising:
   a data storage media comprising one or more rotatable discs;
   a spindle motor coupled to the one or more rotatable discs;
   an auxiliary power source comprising back electromotive force (EMF) derived from momentum of the rotating discs via the spindle motor that provides auxiliary power; and
   test circuitry configured to test a usable energy available from momentum associated with the one or more spinning discs at a given rotational speed to supply the auxiliary power to store data in an event of a power loss from a host system by interrupting power to the storage device, writing data to the one or more storage media until usable energy derived from momentum of the rotating discs via the spindle motor is exhausted, and determining how much usable energy is available based on the amount of data written after interrupting power to the storage device.

9. The data storage assembly of claim 8 wherein the test circuitry includes instructions to store bits of data utilizing the auxiliary power source and comprises a failure prediction component configured to predict failure using a quantity of the bits of data stored utilizing the auxiliary power source.

10. The data storage assembly of claim 8 wherein the test circuitry stores bits of data utilizing the auxiliary power source until the auxiliary power source is exhausted and comprises a failure prediction component configured to utilize a quantity of the data bits stored to predict failure of the data storage device.

11. The data storage assembly of claim 8 wherein the test circuitry utilizes instructions stored on the one or more data storage media to test the capacity of the auxiliary power source.

12. A method comprising:
   disconnecting a data storage device including one or more rotating discs powered by a spindle motor from a power source of a host system;
   supplying power to one or more components of the data storage device utilizing an auxiliary power source of the data storage device comprising back electromotive force (EMF) derived from momentum of the rotating discs via the spindle motor; and
   testing a capacity of the auxiliary power source to supply the power the one or more components of the data storage device by writing data to the one or more storage media until usable energy derived from momentum of the rotating discs via the spindle motor is exhausted, and determining how much usable energy is available based on the amount of data written after disconnecting the data storage device from the power source of the host system.

13. The method of claim 12 and comprising:
   outputting a failure prediction for the data storage device utilizing the tested capacity of the auxiliary power source.

14. The method of claim 12 wherein the step of testing the capacity of the auxiliary power source is performed during manufacture of the data storage device prior to shipping the data storage device.

15. The method of claim 12 further comprising:
   operating the spindle motor to charge the auxiliary power source prior to testing the capacity of the auxiliary power source.

16. The method of claim 12 wherein the step of testing the capacity of the auxiliary power source comprises:
   storing bits of data to one or more data storage media of the data storage device utilizing the auxiliary power source; and
   using a quantity of the data bits stored to the one or more data storage media utilizing the auxiliary power source to predict failure.

17. The method of claim 16 wherein the method implements instructions stored in the one or more data storage media of the data storage device to store the bits of data until the auxiliary power source is exhausted.

18. The method of claim 16 and comprising:
   storing the bits of data utilizing the auxiliary power source until the auxiliary power source is exhausted;
   restoring the power source of the host system to the data storage device after the auxiliary power is exhausted; and
   outputting a failure prediction based upon the quantity of the data bits stored utilizing the auxiliary power source.

* * * * *